JOHN R. MINTER.
Improvement in Cotton Cultivator.
No. 123,410.　　　　　　　　　　Patented Feb. 6, 1872.
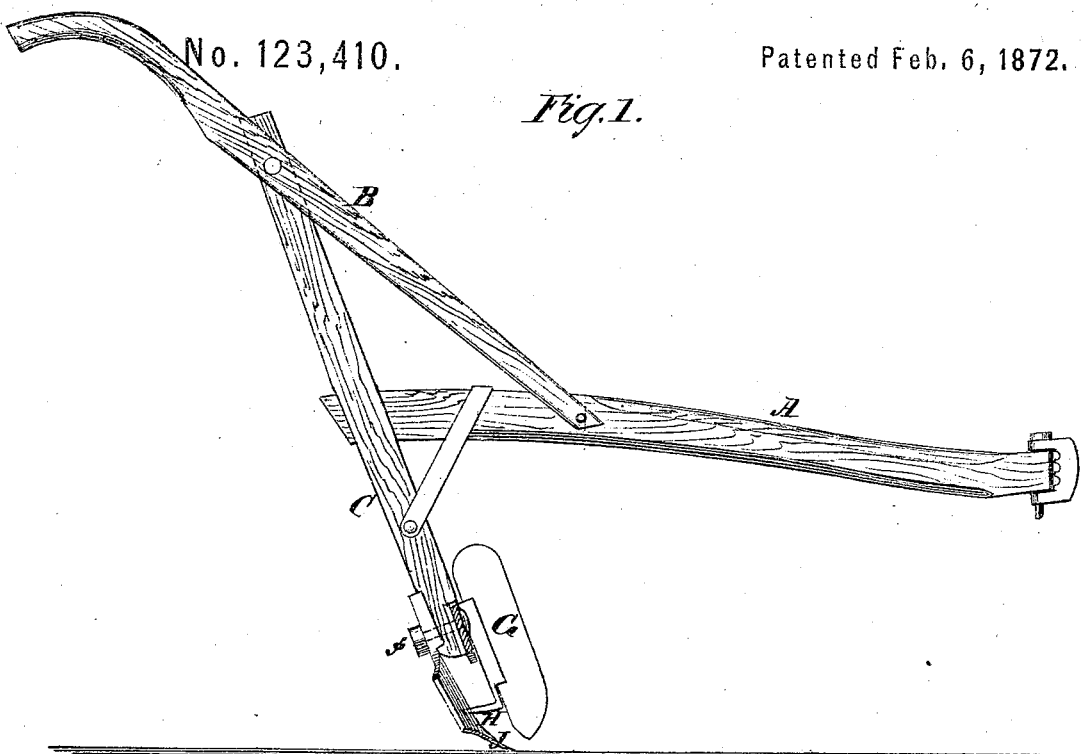
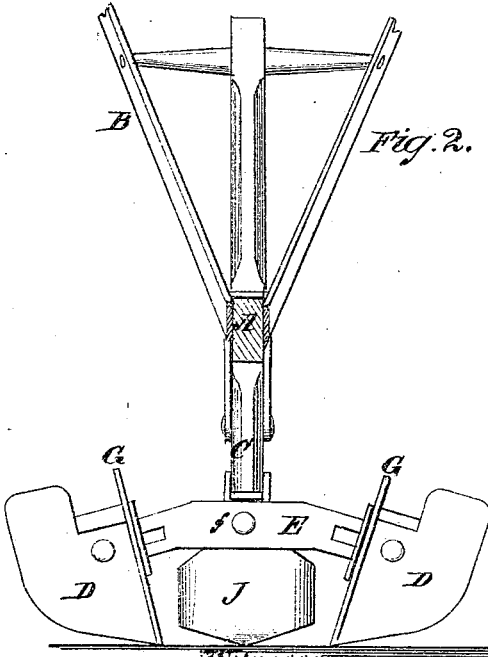
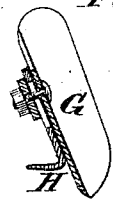
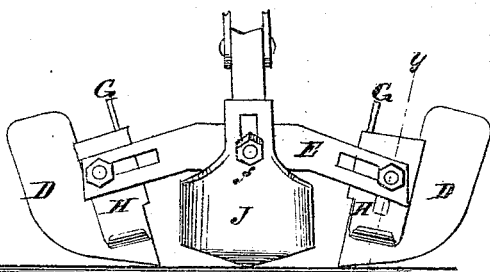

123,410

UNITED STATES PATENT OFFICE.

JOHN R. MINTER, OF UNIONVILLE, SOUTH CAROLINA.

IMPROVEMENT IN CULTIVATORS.

Specification forming part of Letters Patent No. 123,410, dated February 6, 1872.

Specification describing certain Improvements in Cotton-Cultivator, invented by JOHN R. MINTER, of Unionville, in the county of Union and State of South Carolina.

The invention will first be fully described, and then clearly pointed out in the claim.

In the accompanying drawing, Figure 1 is a side elevation. Fig. 2 is a sectional front view. Fig. 3 is a back view; and Fig. 4 is a sectional detail on $y\ y$ of Fig. 3, showing the gauge attached to one of the scrapers.

Similar letters of reference indicate corresponding parts.

A is the beam; B, the handles; C, the standard, to the bottom end of which the operating parts of the implement are attached. D D are two scrapers, adjustably attached to the slotted transverse bar E. This bar is attached to the lower end of the standard C by the bolt $f$. This bar is slotted at the ends, as seen in Fig. 3. The scrapers are attached to it by a bolt each, so that they can be adjusted nearer to or further from the center, or turned so as to be varied (vertically) in position. The scrapers D D have each a wing, G, which projects out at a right angle from the main plate. These wings act as cutters or colters through the soil, while they keep the loosened earth from the plants. On each of the back sides of these scrapers D D is a gauge, H, which is slotted and adjustable up and down on the back, by means of the bolt $f$. These gauges govern the depth which the scrapers are allowed to work in the ground. J is a cultivator-tooth or shovel-plow, which is attached to the end of the standard C below the bar E. The shank of this tooth is slotted so that it may be moved up and down. It may be removed entirely when it is desired that the scrapers D D should straddle the row of cotton, corn, or other crop. For the first time going over the field with the cultivator, the row would generally be straddled and consequently the shovel or tooth would be taken off; but for cutting and stirring up the entire soil-surface between the rows it would be put on. In the cultivation of cotton it has been found extremely difficult to find a substitute for the hoe. The ordinary plows and cultivators are too inflexible and rigid to suit the purpose. With this adjustable implement, it is believed that the cultivation of the cotton-plant will be greatly facilitated, and that it may be employed to good advantage in the cultivation of corn and other crops.

Having thus described my invention, I claim as new, and desire to secure by Letters Patent—

The scrapers D, gauges H, and wings G, combined as described with cross-bar E, and the whole applied to the standard of a cultivator, as and for the purpose described.

J. R. MINTER.

Witnesses:
   GEORGE W. MABEE,
   T. B. MOSHER.